(12) United States Patent
Lee et al.

(10) Patent No.: US 7,426,204 B2
(45) Date of Patent: Sep. 16, 2008

(54) SYMBOL SYNCHRONIZATION METHOD FOR OFDM-BASED WIRELESS COMMUNICATION SYSTEM

(75) Inventors: Sang-Hoon Lee, Seoul (KR); Mi-Sun Do, Suwon-si (KR); Sung-Hyun Cho, Seoul (KR); Yung-Soo Kim, Seongnam-si (KR)

(73) Assignees: Samsung Electronics Co., Ltd (KR); Yonsel University (KR)

( * ) Notice: Subject to any disclaimer, the term of this patent is extended or adjusted under 35 U.S.C. 154(b) by 389 days.

(21) Appl. No.: 11/173,626

(22) Filed: Jul. 1, 2005

(65) Prior Publication Data

US 2006/0002367 A1 Jan. 5, 2006

(30) Foreign Application Priority Data

Jul. 1, 2004 (KR) .................. 10-2004-0051077

(51) Int. Cl.
*H04J 3/06* (2006.01)
(52) U.S. Cl. ............... 370/350; 370/210; 370/401; 370/331; 370/503; 370/208; 455/436; 455/444; 714/746; 375/354; 375/260
(58) Field of Classification Search ............ 370/350, 370/210, 401, 331, 503, 208; 455/436–444; 714/746; 375/354, 260
See application file for complete search history.

(56) References Cited

U.S. PATENT DOCUMENTS 7,203,245 B1 * 4/2007 Murphy .................. 375/260

| 2002/0122437 | A1 | 9/2002 | Cioffi et al. |
| 2003/0072397 | A1 | 4/2003 | Kim et al. |
| 2005/0068886 | A1 * | 3/2005 | Wang et al. ............ 370/210 |
| 2006/0062196 | A1 * | 3/2006 | Cai et al. ............... 370/345 |

FOREIGN PATENT DOCUMENTS

| EP | 1 139 600 | 10/2001 |
| JP | 2004-015192 | 1/2004 |
| KR | 1020010013856 | 2/2001 |
| WO | WO 00/14915 | 3/2000 |
| WO | WO 03/017689 | 2/2003 |

OTHER PUBLICATIONS

Nobuaki Mochizuki et al., "A High Performance Frequency and Timing Synchronization Technique for OFDM", NTT Wireless Systems Laboratories, pp. 3443-3448, 1998.

* cited by examiner

*Primary Examiner*—Rafael Pérez-Gutiérrez
*Assistant Examiner*—YungSang Lau
(74) *Attorney, Agent, or Firm*—The Farrell Law Firm, PC (57) ABSTRACT

Disclosed is a symbol synchronization method in an OFDM-based communication system which includes multiple access nodes supporting wireless connection of terminals, supports multi-connection of each terminal for the access nodes and performs synchronization by means of a cyclic prefix. The symbol synchronization method includes monitoring connection of a new access node; setting a number of times by which the new access node transmits equal symbols and a number of times by which at least one existing access node transmits the equal symbols when the connection of the new access node is detected; transmitting the equal symbols by the determined number of times by each access node; and performing synchronization by means of the symbols received from the access nodes by the terminal.

16 Claims, 11 Drawing Sheets

SYMBOL SYNCHRONIZATION METHOD FOR OFDM-BASED WIRELESS COMMUNICATION SYSTEM

PRIORITY

This application claims priority to an application entitled "Symbol Synchronization Method For OFDM-Based Wireless Communication System" filed in the Korean Intellectual Property Office on Jul. 1, 2004 and assigned Serial No. 2004-51077, the contents of which are incorporated herein by reference.

BACKGROUND OF THE INVENTION

1. Field of the Invention

The present invention relates to a mobile communication system, and more particularly to a symbol synchronization method for an orthogonal frequency division multiplexing (OFDM)-based wireless communication system.

2. Description of the Related Art

OFDM schemes are suitable for high speed data transmission through a wire/wireless channel. Recently, research into the OFDM scheme has been actively pursued.

Figure 1:
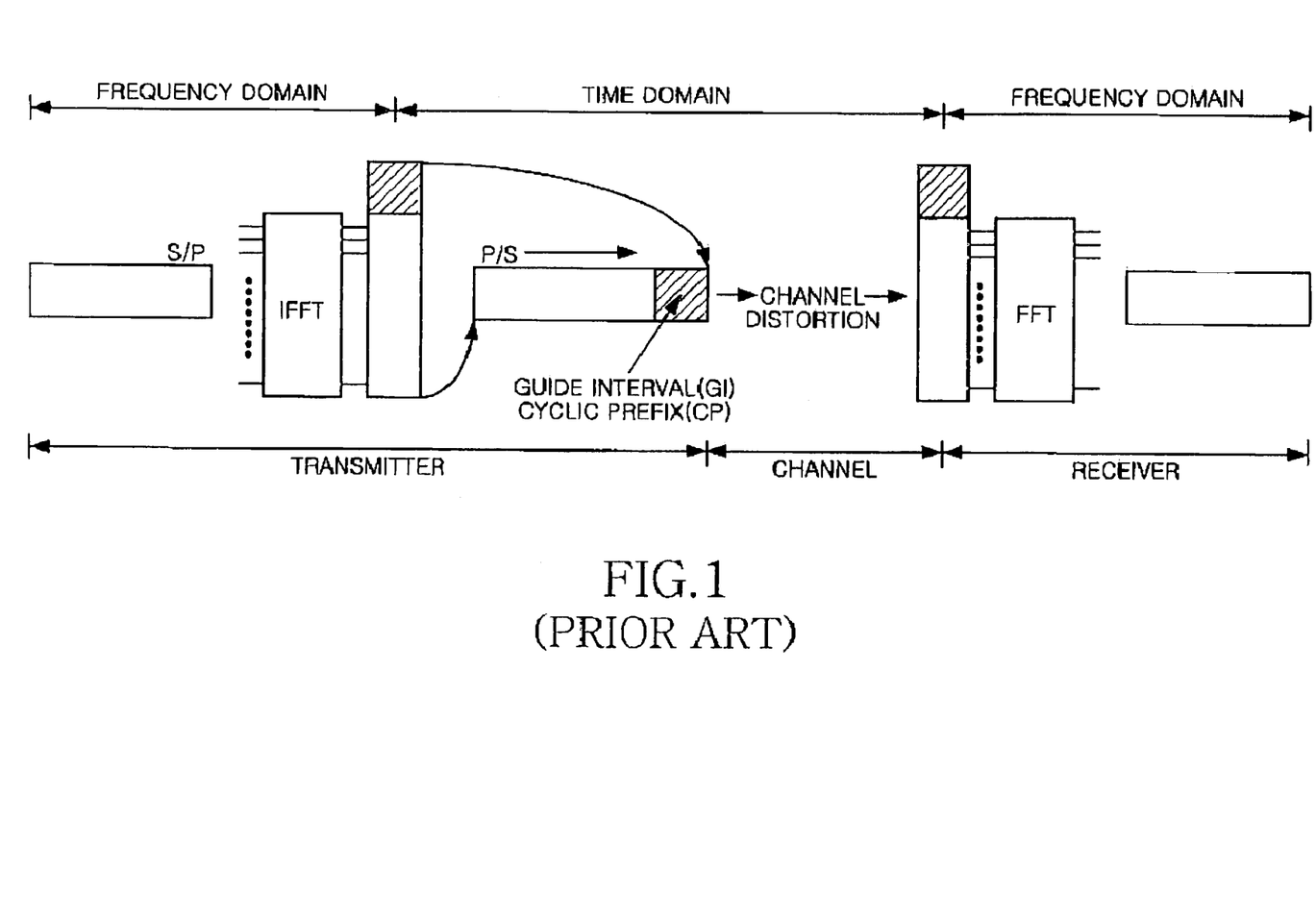
FIG. 1 is a diagram illustrating a general data transmission/reception process in an OFDM system.

FIG. 1 is a diagram illustrating a general data transmission/reception process in an OFDM system. As shown in FIG. 1, in an OFDM scheme, input data is serial-to-parallel converted based on the number of subcarriers, the output parallel data is modulated through an inverse fast fourier transform (IFFT), the modulated data is multiplexed on a time domain, a guard interval (GI) is inserted into the multiplexed data, and the multiplexed data is then transmitted. A reception-side restores the transmitted data through a fast fourier transform (FFT). Generally, in order to prevent inter carrier interference (ICI) from occurring in a predetermined FFT window due to a synchronization error, a cyclic prefix (CP) obtained by copying a last portion of an effective symbol interval is inserted and used as a guard interval.

In an OFDM scheme, a symbol period increases as the number of subcarriers increases, while data transmission speed is maintained through an IFFT. Further, since an OFDM scheme uses a subcarrier having a mutual orthogonality, the OFDM scheme has a bandwidth efficiency that is high as compared with the conventional frequency division multiplexing (FDM). Furthermore, since the OFDM scheme has a long symbol period, the OFDM scheme is strong against interference between symbols as compared with a single carrier modulation scheme.

Generally, a modulation/demodulation of an OFDM signal is efficiently performed through an IFFT/FFT or an inverse discrete cosine transform (IDCT)/discrete cosine transform (DCT). However, since data modulated by means of an IFFT in a modulation process may be restored into original data through an FFT of a reception-side, it is required to provide physical layer modules corresponding to the number of radio access routers (RARs) which transmit data in order to simultaneously receive the data from different RARs. In other words, when a terminal must maintain connections with two RARs in a particular situation such as a soft handover, the terminal must perform an FFT for each connection in order to maintain the connections with two RARs.

Since an OFDM-based data transmission/reception scheme modulate/demodulate data by means of an IFFT/FFT, a terminal must separately process frames received from a plurality of radio access routers (RARs) in order to receive data from different RARs.

A multi-connection method by which a terminal including two physical layer modules processes signals received from two RARs is disclosed in patent publication a WO03017689 to Laroia, et al.

Figure 2:
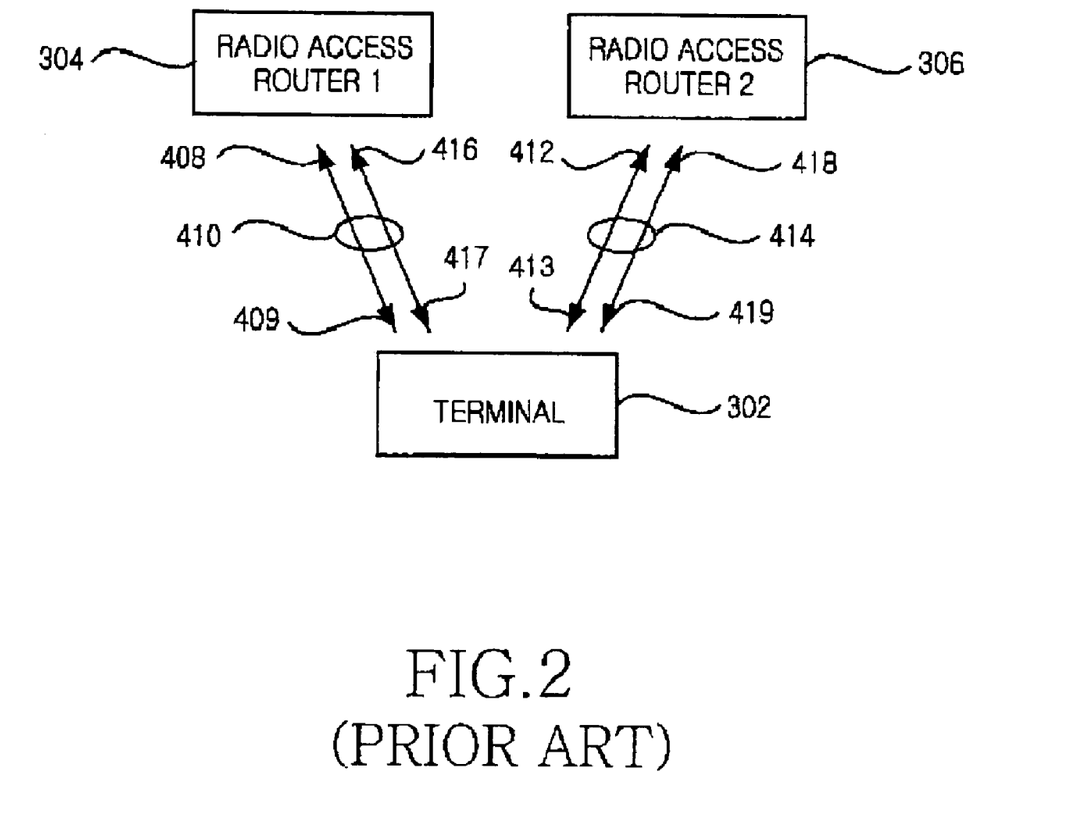
FIG. 2 is a block diagram illustrating a multi-connection method for supporting the mobility of a terminal in the conventional OFDM-based system.
Figure 3:
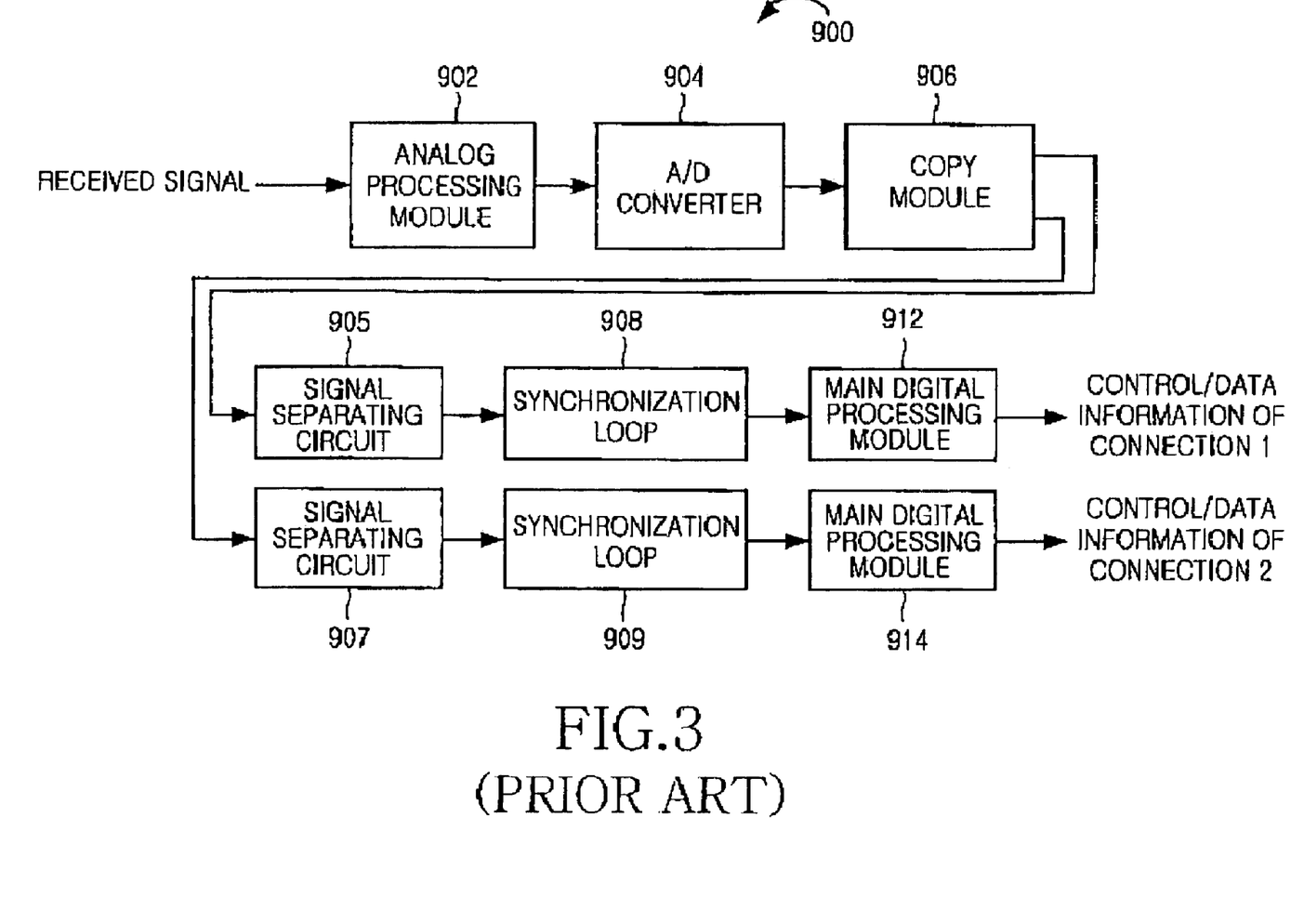
FIG. 3 is a block diagram showing the construction of a terminal for a multi-connection in the system of FIG. 2.

FIG. 2 is a block diagram illustrating a multi-connection method for supporting the mobility of a terminal in the conventional OFDM-based system and FIG. 3 is a block diagram showing the construction of a terminal for a multi-connection in the system of FIG. 2.

In FIG. 2, the terminal 302 maintains connections 410 and 414 with two RARs 304 and 306. The connections 410 and 414 include upward control links 408 and 412 and downward control links 409 and 413, and upward data links 416 and 418 and downward data links 417 and 419.

In order to connect with two RARs as described above, the terminal 900 includes an analog processing module 902, an analog/digital converter 904, a copy module 906, a pair of signal separating circuits 905 and 907, a pair of synchronization loops 908 and 909, and a pair of main digital processing modules 912 and 914, as shown in FIG. 3.

SUMMARY OF THE INVENTION

The conventional terminal supporting such a multi-connection must use two physical layer modules in order to support the mobility of the terminal in a situation such as a handover, thereby increasing the complexity of hardware and the manufacturing cost.

Accordingly, it is necessary to provide a method using one physical layer module for multi-connections with multiple RARs and a synchronization method for simultaneously receiving signals transmitted from the multiple RARs.

Accordingly, the present invention has been made to solve at least the above-mentioned problems occurring in the prior art, and an object of the present invention is to provide a symbol synchronization method which provides a data structure enabling a multi-connection between one terminal and two or more RARs and supports such a multi-connection in a multi-carrier-based communication system.

In order to accomplish the aforementioned object, according to one aspect of the present, there is provided a symbol synchronization method in a multi-carrier-based communication system which includes multiple access nodes supporting the wireless connection of terminals, supports the multi-connection of each terminal for the access nodes and performs synchronization by means of a cyclic prefix, the symbol synchronization method including the steps of determining a number of times by which each of at least two access nodes connected through a multi-connection determined when at least two wireless environments transmit equal symbols; transmitting the equal symbols the determined number of times by each access node; and performing by the terminal synchronization by means of the symbols received from the access nodes.

In order to accomplish the aforementioned object, according to one aspect of the present, there is provided a symbol synchronization method in an OFDM-based communication system which includes multiple access nodes supporting wireless connection of terminals, supports a multi-connection of each terminal for the access nodes and performs synchronization by means of a cyclic prefix, the symbol synchronization method including the steps of monitoring connections of a new access node; setting a number of times by which the new access node transmits equal symbols and a number of times by which at least one existing access node transmits the equal symbols when the connection of the new access node is detected; transmitting the equal symbols the determined number of times by each access node; and performing synchronization by means of the symbols received from the access nodes by the terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configuration incorporated herein will be omitted when it may obscure the subject matter of the present invention.

It is difficult for a terminal to connect to two RARs at one point in time with respect to the IFFT/FFT characteristics of a multi-carrier-based communication system. The present invention uses one data channel in a switching mode between RARs according to the movement of the terminal, thereby preventing a waste of resources. Simultaneously, the present invention maintains connections with two RARs during a handoff by means of two control channels, thereby enabling a fast switching which is one benefit of a soft handoff.

Figure 4:
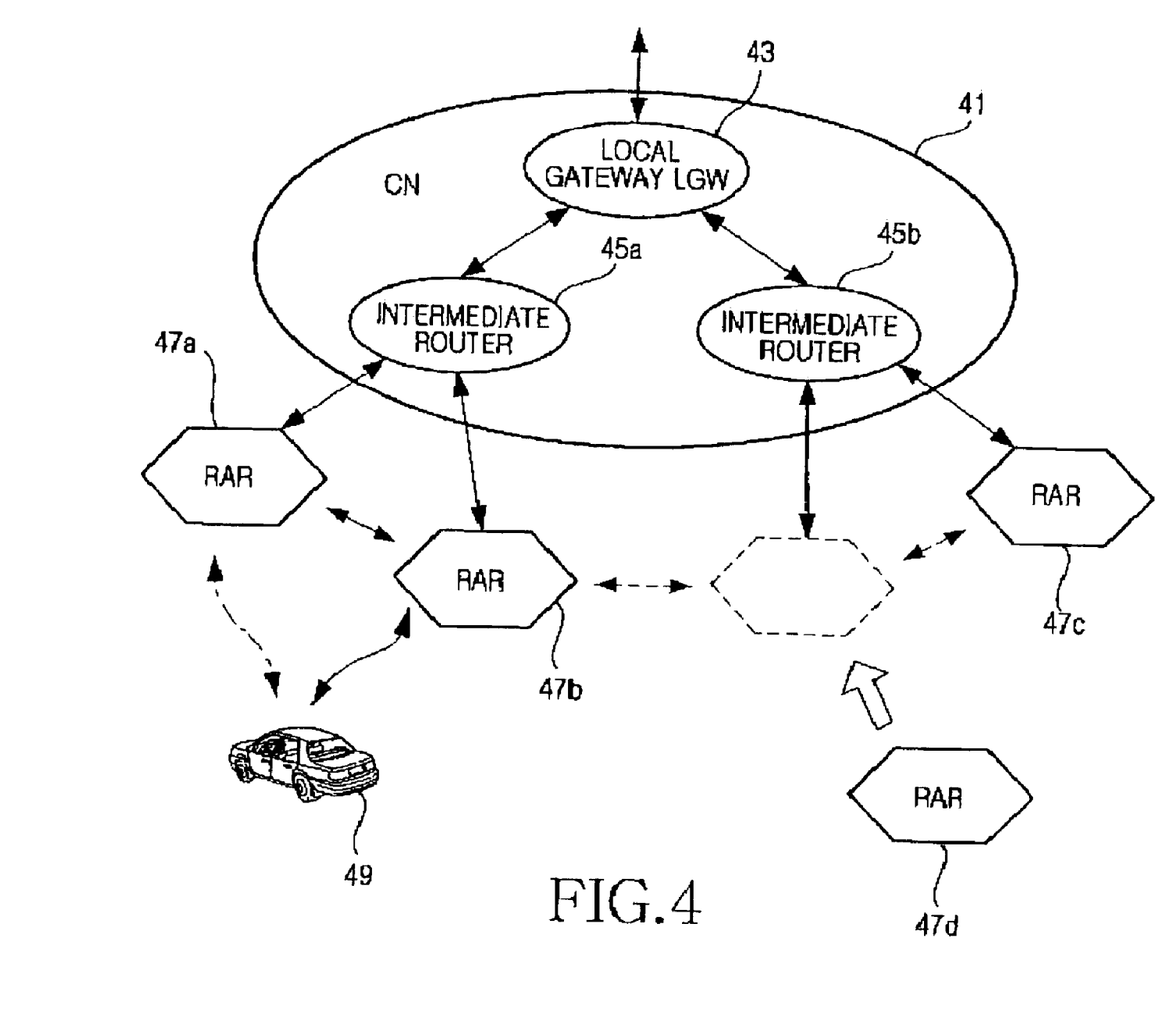
FIG. 4 is a block diagram showing a structure of a mobile IP-based 4G network to which the present invention is applied.

FIG. 4 is a block diagram showing a structure of a mobile IP-based 4G network to which the present invention is applied.

In FIG. 4, a core network 41 includes intermediate routers IRs 45a and 45b that support the mobility of a terminal rising IP technology, and a local gateway (LGW) 43. The core network 41 is connected to an external network such as the Internet through the local gateway 43. The intermediate routers 45a and 45b are connected to RARs 47a, 47b and 47c and provide a service to terminals within their own service coverage areas. The RAR is an apparatus obtained by integrating functions of an radio network controller (RNC) and a base transceiver station (BTS) in a 3G network. In a 4G network according to the present invention, the RAR includes a plug & play function to incorporate the frequent connection or disconnection of network devices. Accordingly, when a new RAR 47d is installed on a network in which synchronization has been already accomplished, the RAR 47d automatically synchronizes with neighbor RARs.

Figure 5:
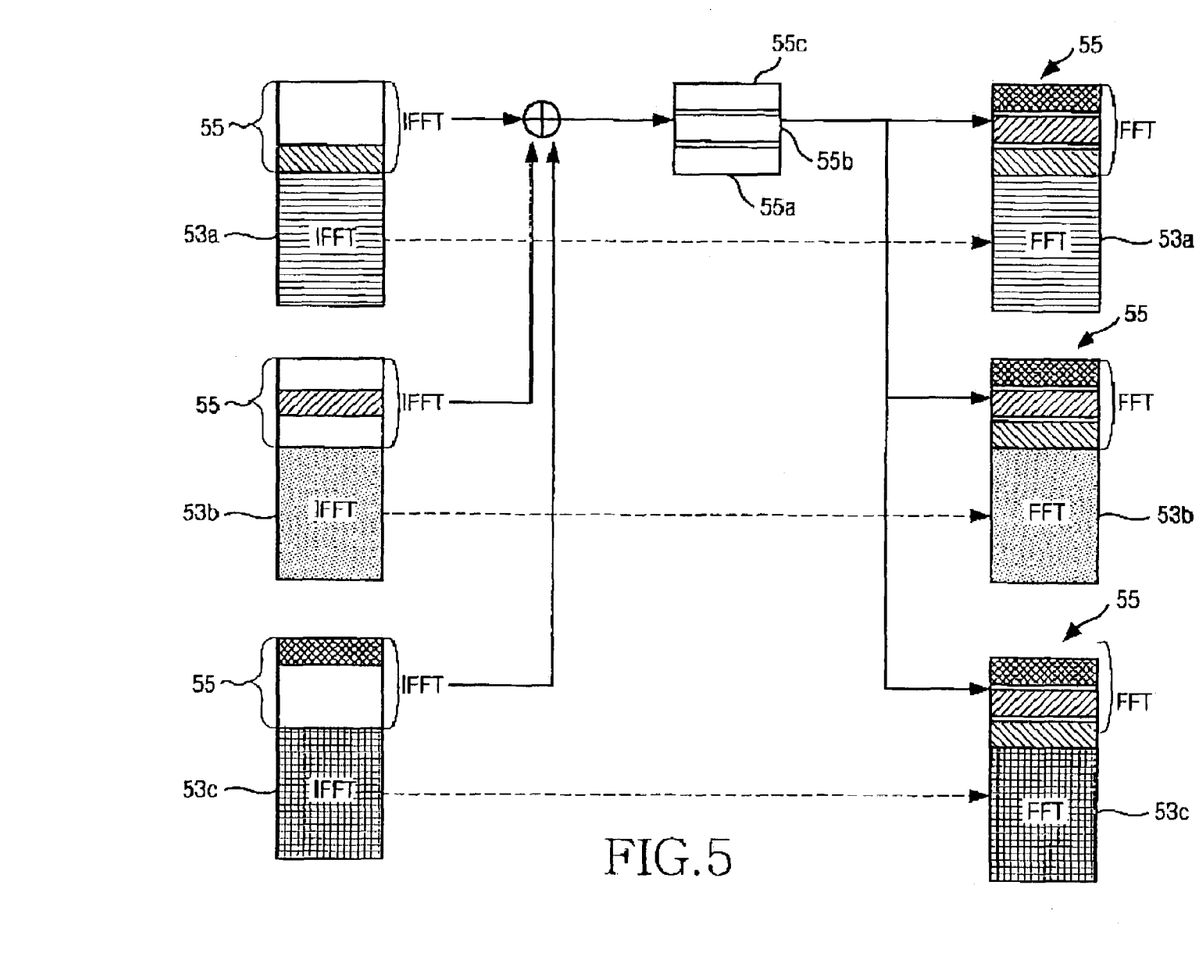
FIG. 5 is a diagram illustrating a data structure for a multi-connection in an OFDM-based system according to a preferred embodiment of the present invention.

FIG. 5 is a diagram illustrating a data structure for a multi-connection in an OFDM-based system according to a preferred embodiment of the present invention.

As shown in FIG. 5, in order to accomplish a semi-soft handover according to the present invention, the bandwidth of a downlink may be classified into two parts. One part is dedicated data bands 53a, 53b and 53c for transmitting data. The other part is a dedicated control band 55 used for synch channel (SCH), a broadcast channel (BCH), a common pilot channel (CPICH) and a semi-soft handover control channel (SSHCCH).

FIG. 5 illustrates the case in which three RARs transmit data to three different terminals. Herein, the RARs transmit the data through the dedicated data bands 53a, 53b and 53c and transmit control signals such as signals for supporting a handover through the dedicated control band 55. The dedicated control band 55 is divided to be assigned to control channels 55a, 55b and 55c of the terminals.

In other words, the RARs are distinguished from each other by the assigned unique control channels 55a, 55b and 55c. In each RAR, a part of the dedicated control band [PLEASE CONFIRM.], except for the control channel assigned to the terminal is zero padded, dedicated control band, and the control channels 55a, 55b and 55c of the RARs are multiplexed and transmitted to the terminals. The terminals having received the multiplexed control channels 55a, 55b and 55c through the dedicated control band 55 decode the control channels transmitted to the terminals, and receive data received from corresponding RARs through the dedicated data bands 53a, 53b and 53c.

The dedicated control band 55 may be multiplexed by means of a multiplexing scheme such as a FDM and a code division multiplexing CDM.

In the embodiment according to the present invention, a case in which three RARs communicate with three terminals has been described as an example. However, the number of RARs and the number of terminals ate not limited to three and may change according to a system and channel environments.

In the communication system with the aforementioned structure, when one terminal receives a dedicated control band including control channels transmitted from multiple RARs and restores the received dedicated control band, synchronization of a symbol unit is required. In particular, a new RAR is installed on a network in which synchronization has already been accomplished, the new RAR must perform symbol synchronization with other RARs on the network.

Figure 6A:
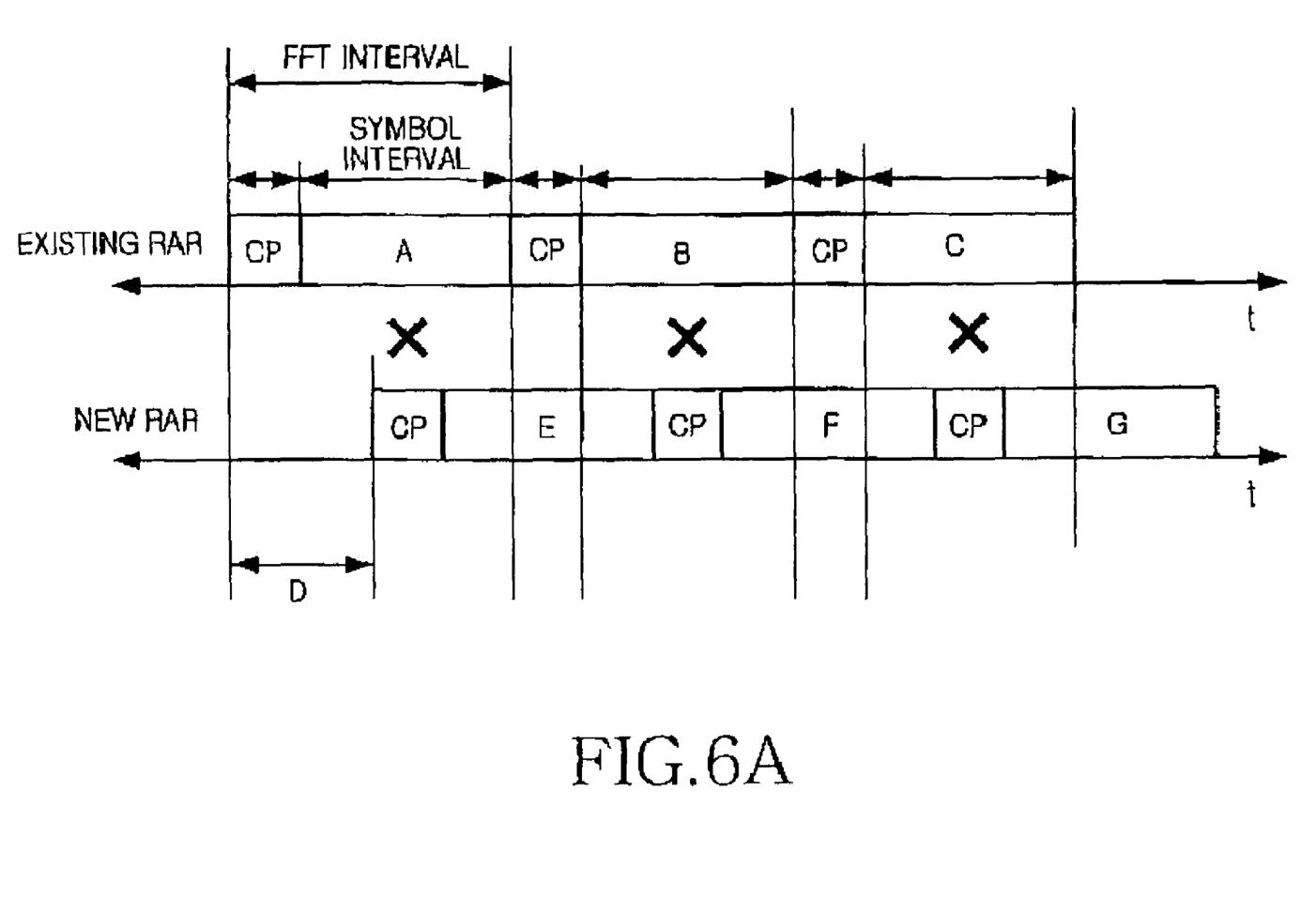
FIGS. 6A and 6B are diagrams illustrating a symbol synchronization method according to an embodiment of the present invention.
Figure 6B:
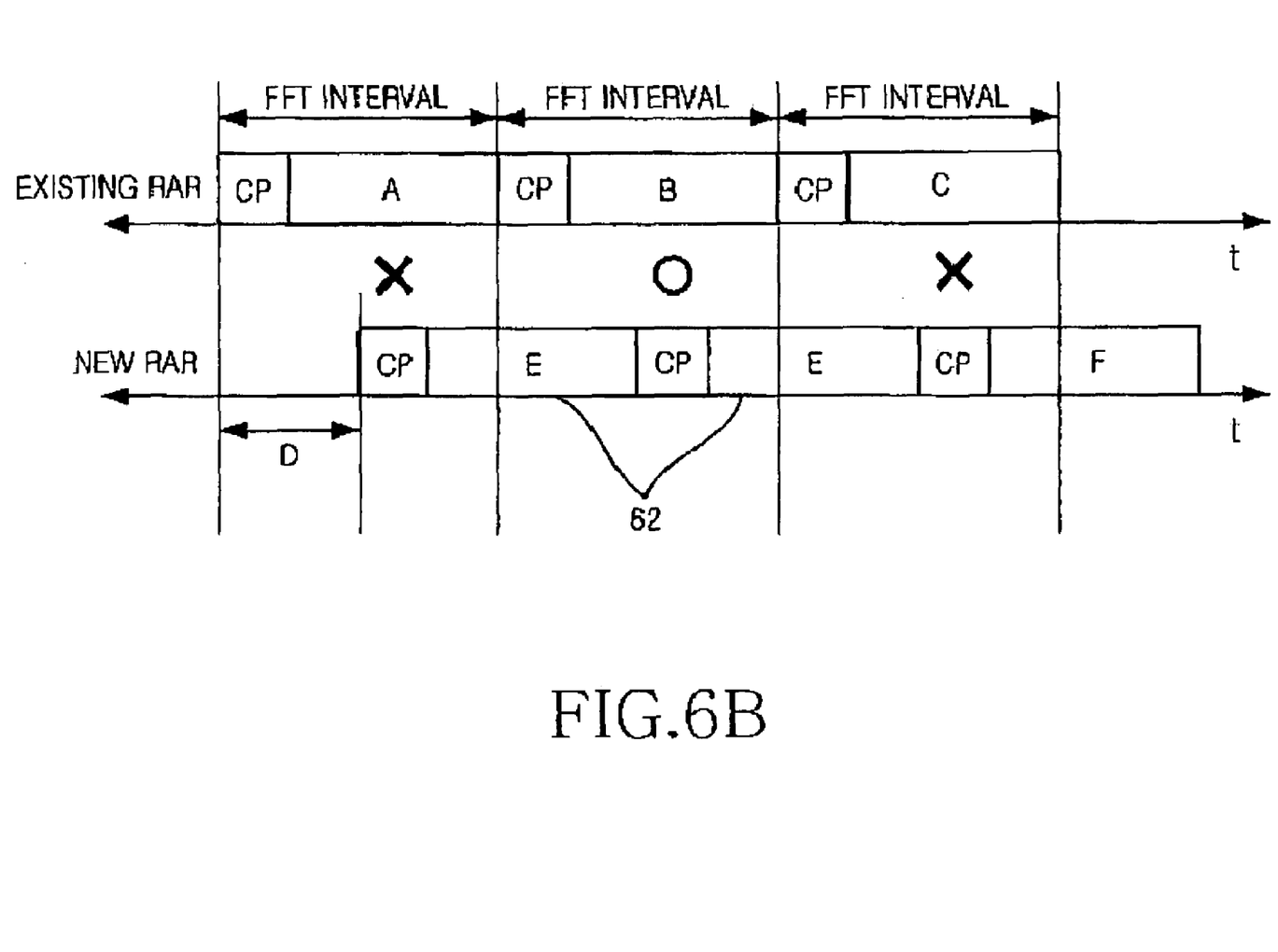

FIGS. 6A and 6A are diagrams illustrating a symbol synchronization method according to one embodiment of the present invention.

As shown in FIG. 6A, a symbol received from a new RAR is received later than a symbol received from the existing RAR by time error D. Herein, since the time error D is greater than the length of a cyclic prefix of an OFDM symbol, a dedicated control band cannot be restored with respect to the characteristics of an OFDM system performing an FFT.

In a first embodiment of the present invention, when a new RAR is installed on a network, the new RAR repeatedly transmits the same symbol twice and a terminal performs an FFT by the sum of a symbol interval and a cyclic prefix.

As shown in FIG. 6B, when the new RAR repeatedly transmits the same symbol 62 twice, the time error D between the symbols from the two RARs is greater than the length of the cyclic prefix. Even though the symbol A of the existing RAR and the symbol E of the new RAR is cannot be synchronized in a first FFT interval of a terminal, the symbol B of the existing RAR can be synchronized with the symbol E of the new RAR in a second FFT interval. This can be accomplished by combining the first symbol E component and the second symbol E component of the new RAR received in the second FFT interval.

Figure 7:
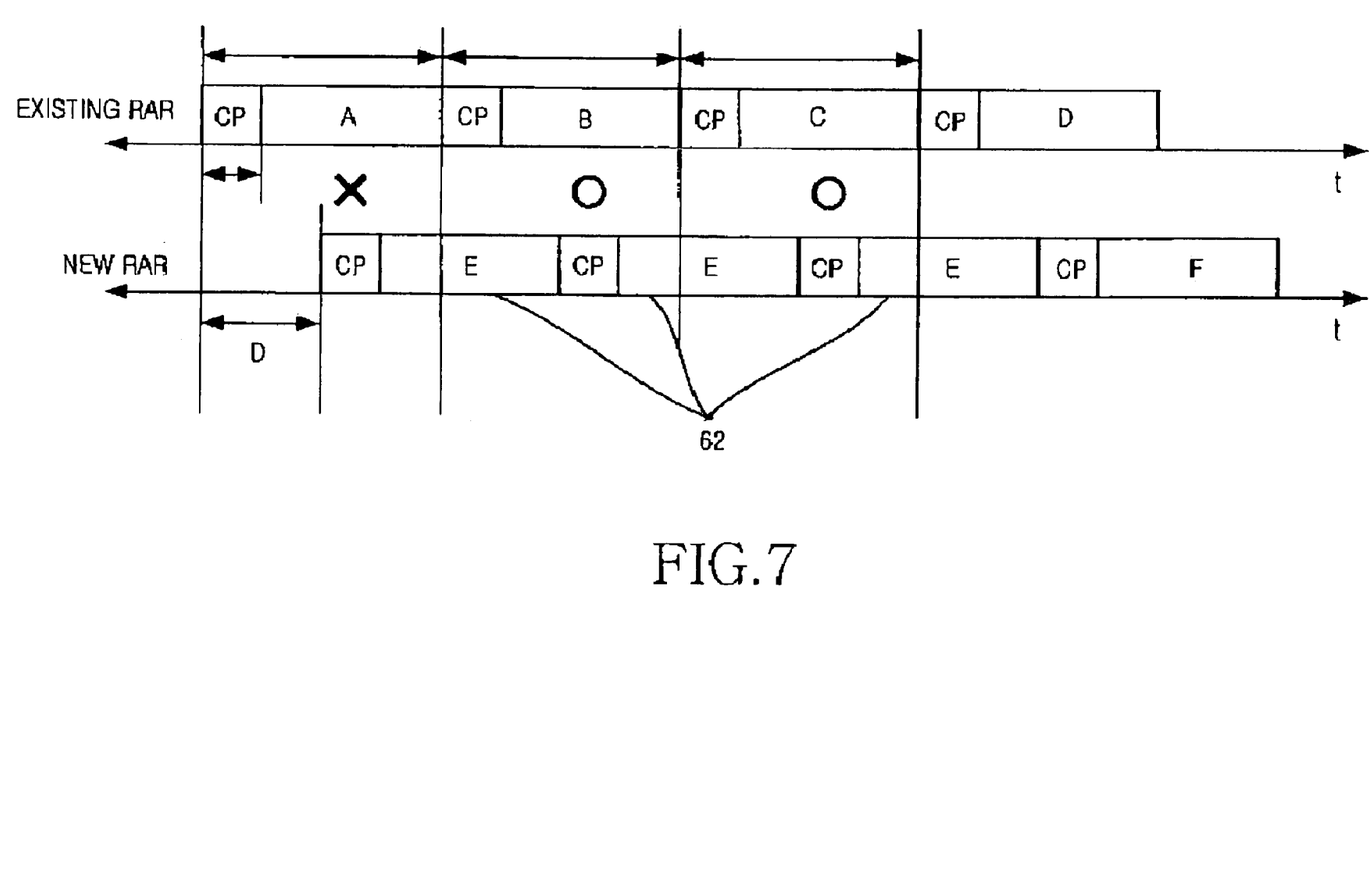
FIG. 7 is a diagram illustrating synchronization when the number of times of a symbol repetition is set to be 3 in a symbol synchronization method according to an embodiment of the present invention.

FIG. 7 is a diagram illustrating a synchronization process when the number of times a symbol is repeated is set to be 3 in the symbol synchronization method according to the present invention.

In FIG. 7, the new RAR repeatedly transmits the same symbol 62 three times. The symbol A of the existing RAR and the symbol E of the new RAR cannot be synchronized in the first FFT interval. The symbol B of the existing RAR synchronizes with the repetition symbol E of the new RAR in the second FFT interval, and the symbol C of the existing RAR also synchronizes with the repetition symbol E of the new RAR in a third FFT interval.

As described above, as the number of symbol repetitions of the new RAR increases, the number of synchronization errors due to a time error between the symbols of the two RARs decreases c, thereby improving the synchronization reliability.

Figure 8:
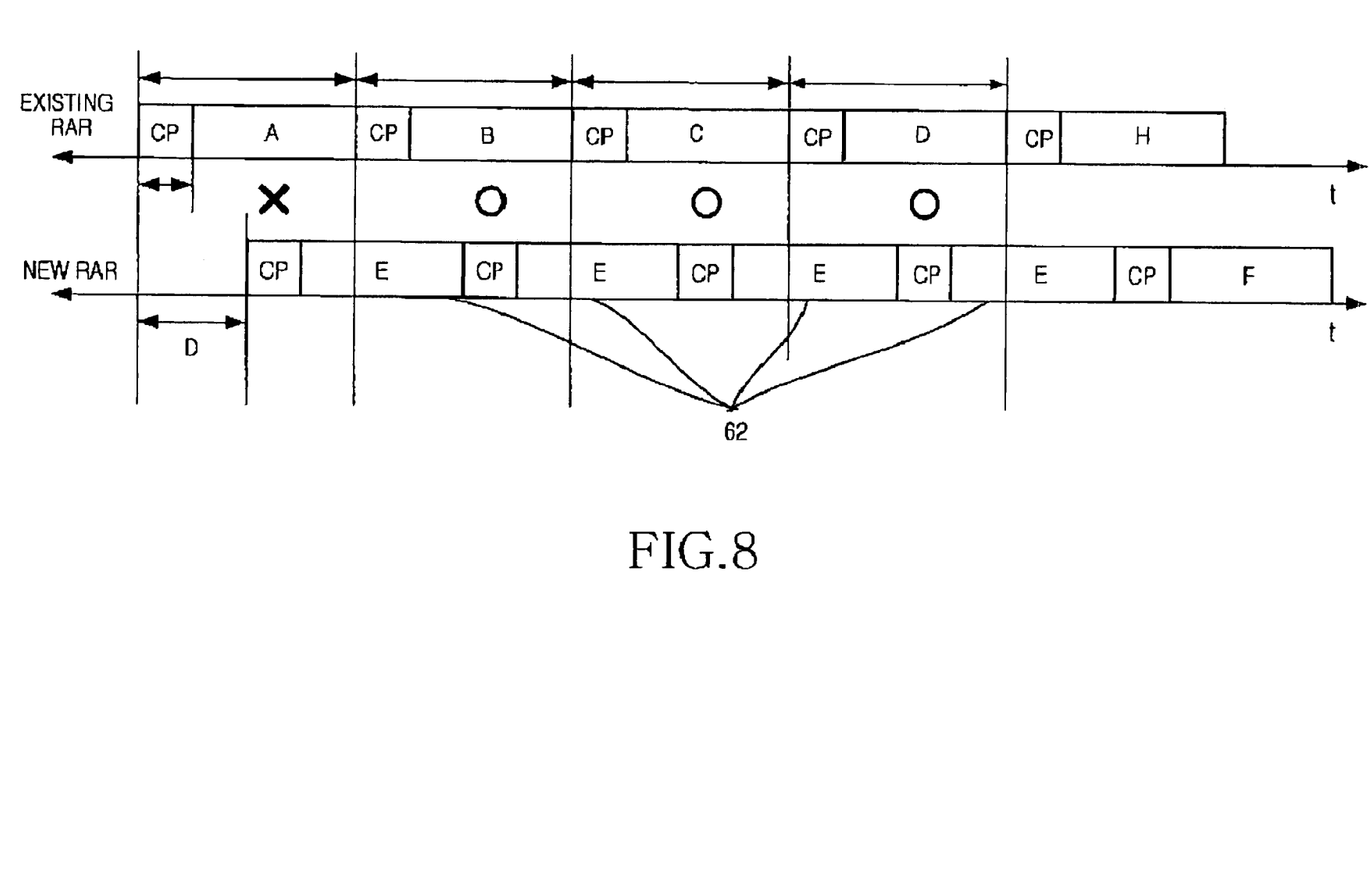
FIG. 8 is a diagram illustrating synchronization when the number of times of a symbol repetition is set to be 4 in a symbol synchronization method according to an embodiment of the present invention.

FIG. 8 illustrates the case where the number of symbol repetitions of the new RAR is 4. Herein, symbol synchronization can be performed similarly to the cases in which the number of symbol repetitions is 2 and 3, and the synchronization reliability is increased.

Figure 9:
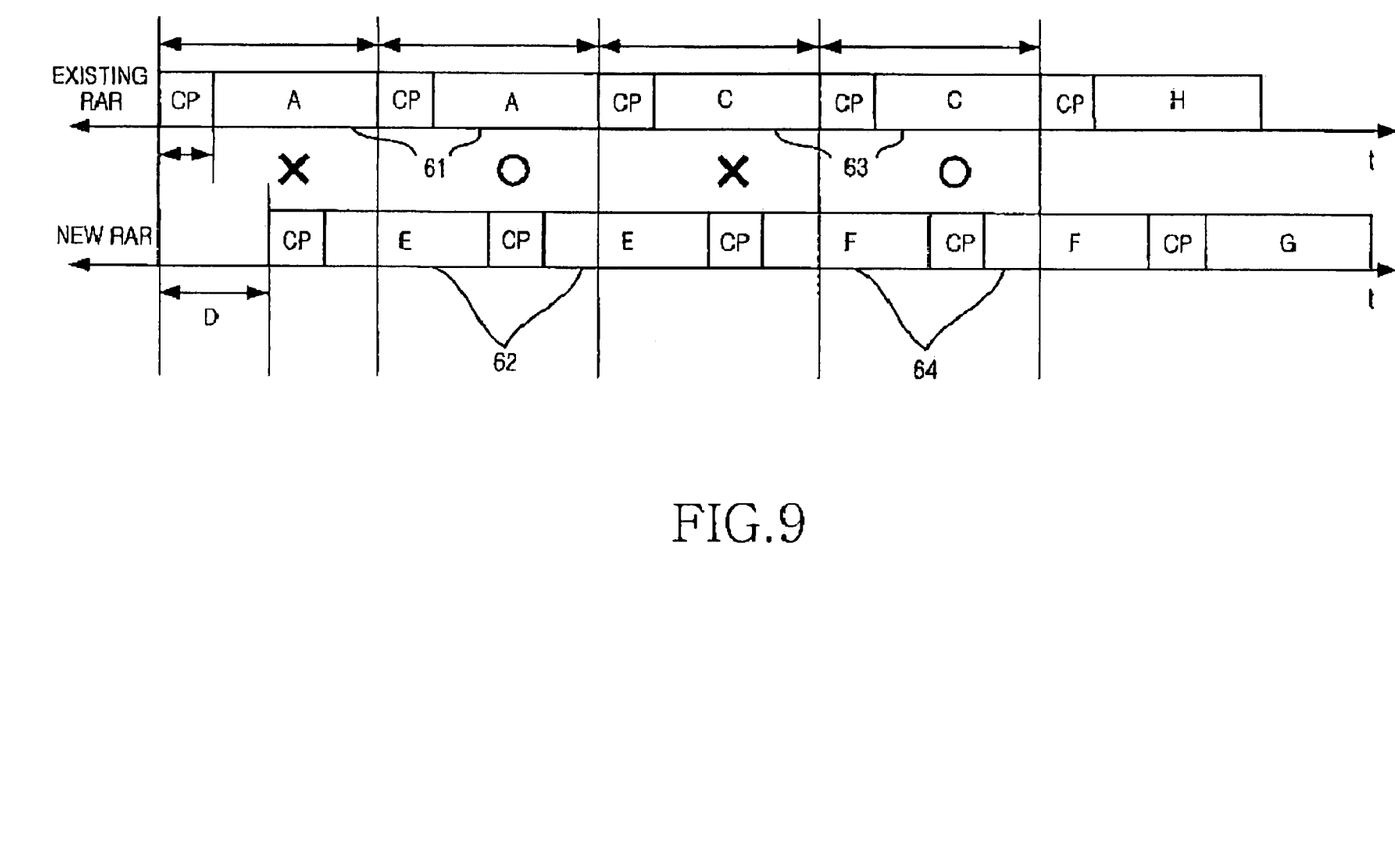
FIG. 9 is a diagram illustrating a symbol synchronization method according to a second embodiment of the present invention.

FIG. 9 is a diagram illustrating a symbol synchronization method according to a second embodiment of the present invention.

As shown in FIG. 9, in the second embodiment of the present invention, a new RAR repeatedly transmits the same symbols similarly to the first embodiment and the existing RAR also repeatedly transmits the same symbols. In the second embodiment, the same symbols are repeatedly transmitted twice, but the number of times for transmission of the same symbols may change.

When the new RAR is installed on a network, the new RAR repeatedly transmits the same symbol 62 twice.

When only the new RAR repeatedly transmits the symbol similarly to the first embodiment, inter-carrier interference ICI occurs in an interval in which symbol synchronization is broken. Therefore, synchronization channel information transmitted to the existing RAR is damaged, so that the reliability of information transmitted to a terminal is decreased.

In order to prevent the aforementioned data loss, the existing RAR also repeatedly transmits the same symbols 62 and 64 by means of time diversity when the new RAR is installed on the network. The installation of the new RAR can be understood by a synchronization request message broadcasted to RARs, for which synchronization has already been accomplished, when the new RAR is installed on the network. Accordingly, when receiving the synchronization request message, a reference RAR among RARs installed on the network starts to repeatedly transmit the same symbols 61 and 63 by the same number of times as that of the symbol repetition of the new RAR.

As described above, the existing RAR and the new RAR repeatedly transmit the symbols by the same number of times, a fast synchronization can be accomplished and inter-carrier interference for the existing RAR can be reduced.

In FIG. 9, even though synchronization cannot occur in a first FFT interval and a third FFT interval of a terminal, symbol synchronization of the existing RAR and the new RAR is accomplished in a second and a fourth FFT interval. Further, even though information of the first and the third symbol of the existing RAR is lost by inter-carrier interference, information can be obtained from a second symbol which is the copy of the first symbol and a fourth symbol which is the copy of the second symbol. Accordingly, interference for the existing RAR can be reduced.

Figure 10:
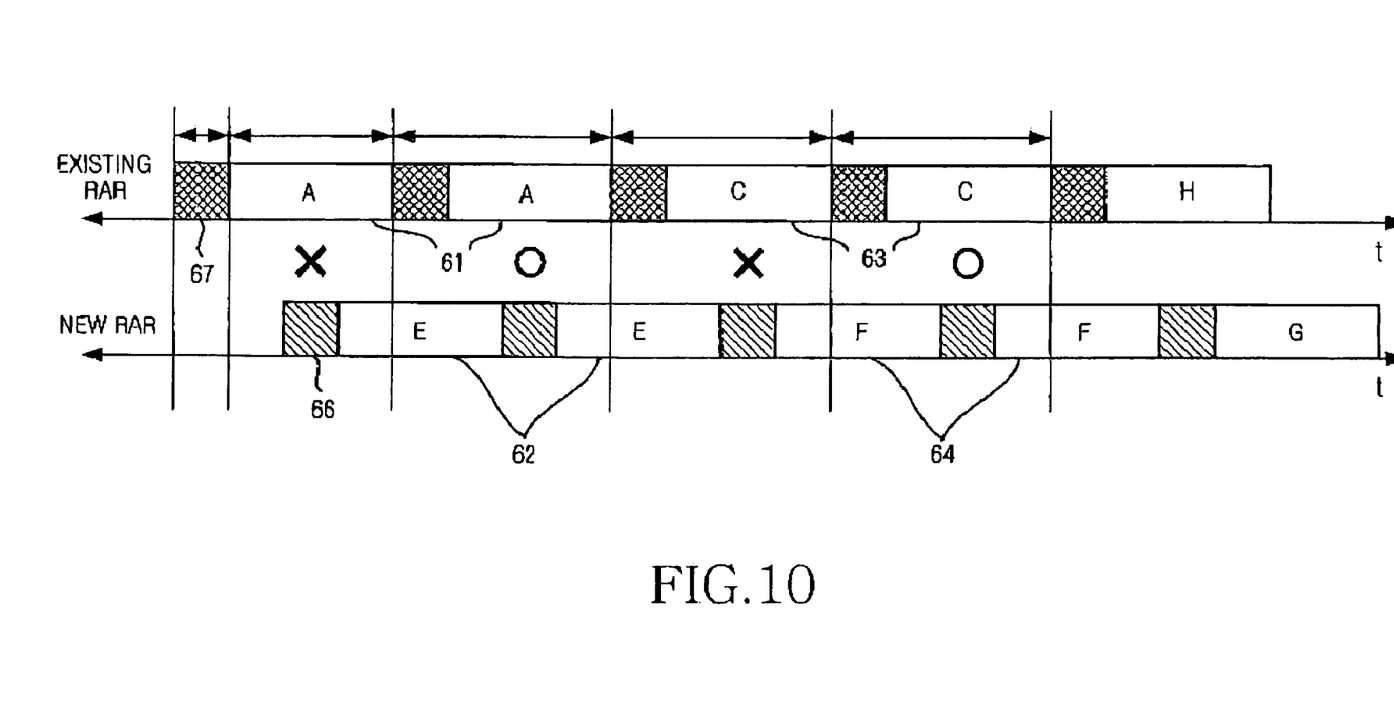
FIG. 10 is a diagram illustrating a symbol synchronization method according to a third embodiment of the present invention.

FIG. 10 is a diagram illustrating a symbol synchronization method according to a third embodiment of the present invention.

As shown in FIG. 10, in the third embodiment of the present invention, the existing RAR and a new RAR repeatedly transmit symbols 61, 62, 63 and 64 by the same number of times similarly to the second embodiment. However, differently from the first and the second embodiments, each RAR uses unique cyclic prefix 67 and 68 according to each RAR, which are present as guard intervals. In other words, each RAR uses a unique known PN sequence always having the same pattern in a time axis through a precoding as a guard interval. Accordingly, a terminal receives a unique known PN sequence 67 of the existing RAR from the existing RAR together with the repetition symbols 61 and 63, and receives a unique known PN sequence 66 of the new RAR from the new RAR together with the repetition symbols 62 and 64, thereby increasing the reliability of correlation between symbols. Consequently, the accuracy of synchronization is improved.

When symbols are repeatedly transmitted and synchronization is thus accomplished in the same manner as those of the aforementioned embodiments, each RAR transmits symbols only once to increase the transmission rate.

As described above, in a symbol synchronization method according to the present invention, a bandwidth of a downlink is classified into two sub-bandwidths in order to support the multi-connection of a terminal with RARs, and one sub-bandwidth is multiplexed to control channels, and the control channels are assigned to the RARs, so that the terminal can perform the multi-connection for multiple RARs by means of one physical layer module.

Further, in a symbol synchronization method according to the present invention, when a new RAR is connected to a network, an existing RAR or a new RAR repeatedly transmits the same symbols by several times for synchronization, so that quick and reliable synchronization can be accomplished.

Furthermore, in a symbol synchronization method according to the present invention, a known PN sequence is used as a guard interval, thereby increasing the reliability of correlation between symbols and thus improving the accuracy of synchronization.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A symbol synchronization method in a multi-carrier-based communication system which includes multiple access nodes supporting wireless connections of terminals, supports multi-connections of each terminal for the access nodes, and performs synchronization by means of a cyclic prefix, the symbol synchronization method comprising:

determining numbers of retransmissions of identical symbols for respective access nodes connected to a terminal;

transmitting, by the access nodes, the respective identical symbols the determined numbers of times;

performing synchronization, by the terminal, based on the symbols received from the respective access nodes.

2. The symbol synchronization method as claimed in claim 1, wherein the symbols received from the access nodes are processed by a unit of a fast Fourier transform (FFT) length of the terminal.

3. The symbol synchronization method as claimed in claim 2, wherein the FFT length is the sum of a symbol interval and a length of a cyclic prefix added to a corresponding symbol.

4. The symbol synchronization method as claimed in claim 3, wherein the number of retransmission of the identical symbol by a first access node is 1 and the number of retransmission by a second access node is at least 2.

5. The symbol synchronization method as claimed in claim 4, wherein each access node adds an identical cyclic prefix to the symbols to be retransmitted.

6. The symbol synchronization method as claimed in claim 3, wherein the access nodes retransmits the identical symbols at least twice, respectively.

7. The symbol synchronization method as claimed in claim 6, wherein each access node adds an identical cyclic prefix to the symbols to be transmitted.

8. A symbol synchronization method in an OFDM-based communication system which includes multiple access nodes supporting wireless connections of terminals, supports multi-connection of each terminal for the access nodes, and performs synchronization by means of a cyclic prefix, the symbol synchronization method comprising the steps of:

monitoring for a connection of a new access node;

setting a number of retransmissions of an identical symbol for the new access node and a number of retransmissions of a identical symbol for at least one existing access node when the connection of the new access node is detected;

transmitting, by the access nodes, the identical symbols the determined number of retransmissions, respectively; and     performing, by the terminal, synchronization using the symbols received from the access nodes.

9. The symbol synchronization method as claimed in claim 8, wherein the symbols received from the access nodes are processed by a unit of a fast Fourier transform (FFT) length of the terminal.

10. The symbol synchronization method as claimed in claim 9, wherein the FFT length is the sum of a symbol interval and a length of a cyclic prefix added to a corresponding symbol.

11. The symbol synchronization method as claimed in claim 10, wherein the number of retransmissions of the identical symbol by the new access node is set to be, over at least 2 and the number of retransmission of the identical symbol by the existing access node is set to be 1.

12. The symbol synchronization method as claimed in claim 11, wherein the identical symbols have the identical cyclic prefixes.

13. The symbol synchronization method as claimed in claim 11, wherein the cyclic prefix is precoded in the frequency domain so as to be identically generated in each symbol in the time domain by an inverse fast Fourier transform (IFFT).

14. The symbol synchronization method as claimed in claim 10, wherein the number of retransmissions of the identical symbols for the new access node and the existing access node are set to at least 2, respectively.

15. The symbol synchronization method as claimed in claim 14, wherein the symbols to be retransmitted are added by an identical cyclic prefix.

16. The symbol synchronization method as claimed in claim 14, wherein the cyclic prefix is precoded in the frequency domain so as to be identically generated in each symbol in the time domain by an IFFT.

* * * * *